(12) United States Patent
Ueki (10) Patent No.: US 11,202,136 B2
(45) Date of Patent: Dec. 14, 2021

(54) SPEAKER DEVICE AND ENCLOSURE

(71) Applicant: Foremar LLC, Tokyo (JP)

(72) Inventor: Jun Ueki, Kanagawa (JP)

(73) Assignee: FOREMAR LLC, Tokyo (JP)

(*) Notice: Subject to any disclaimer, the term of this patent is extended or adjusted under 35 U.S.C. 154(b) by 0 days.

(21) Appl. No.: 16/645,983

(22) PCT Filed: Sep. 13, 2018

(86) PCT No.: PCT/JP2018/033915
§ 371 (c)(1),
(2) Date: Mar. 10, 2020

(87) PCT Pub. No.: WO2019/054431
PCT Pub. Date: Mar. 21, 2019

(65) Prior Publication Data
US 2020/0280777 A1    Sep. 3, 2020

(30) Foreign Application Priority Data

Sep. 13, 2017 (JP) .............................. JP2017-175291
Feb. 14, 2018 (JP) .............................. JP2018-023616

(51) Int. Cl.
*H04R 1/02* (2006.01)
*H04R 1/28* (2006.01)

(52) U.S. Cl.
CPC ........... *H04R 1/026* (2013.01); *H04R 1/2803* (2013.01); *H04R 1/2876* (2013.01); *H04R 1/02* (2013.01); *H04R 1/025* (2013.01); *H04R 1/28* (2013.01); *H04R 1/2807* (2013.01); *H04R 1/288* (2013.01); *H04R 1/2811* (2013.01); *H04R 1/2869* (2013.01); *H04R 1/2873* (2013.01)

(58) Field of Classification Search
CPC ...................................................... H04R 1/026
See application file for complete search history.

(56) References Cited

U.S. PATENT DOCUMENTS

| | | | |
|---|---|---|---|
| 4,568,761 A | 2/1986 | Henderson, Jr. | |
| 4,585,090 A | 4/1986 | Lindsay | |
| 2009/0200102 A1 | 8/2009 | Gilbert | |
| 2009/0245562 A1 | 10/2009 | Saiki et al. | |
| 2012/0014551 A1 | 1/2012 | Ohashi et al. | |
| 2013/0142373 A1* | 6/2013 | Kanaya | H04R 1/2873 381/354 |

FOREIGN PATENT DOCUMENTS

| | | |
|---|---|---|
| EP | 3282715 A | 2/2018 |
| JP | 2010-288220 A | 12/2010 |
| WO | WO 2007/116859 A1 | 10/2007 |

OTHER PUBLICATIONS

PCT International Preliminary Report on Patentability, dated Mar. 17, 2020 by The International Bureau of WIPO, Geneva, Switzerland, International Application No. PCT/JP2018/033915.

* cited by examiner

*Primary Examiner* — Andrew L Sniezek
(74) *Attorney, Agent, or Firm* — Hammer & Associates, P.C.

(57) ABSTRACT

There is provided a speaker device 1 having a speaker unit 10 and an enclosure 30 in which a plurality of rod-shaped bodies 31 is integrally bonded to each other and which is arranged in a space behind the speaker unit 10. Thus, a sound wave output from the speaker unit 10 to the rear side thereof can be more effectively damped.

11 Claims, 7 Drawing Sheets

SPEAKER DEVICE AND ENCLOSURE

TECHNICAL FIELD

The present invention relates to technology of a speaker.

BACKGROUND ART

Conventionally, there is technology of suppressing a standing wave resulting from a sound wave output from the rear side of a speaker unit (for example, PTL 1).

CITATION LIST

Patent Literature

PTL 1: JP 2010-288220 A

SUMMARY OF INVENTION

Technical Problem

It is an object of the present invention to more effectively damp a sound wave output from a speaker unit to the rear side thereof.

In order to achieve the object, a first aspect of the present invention is a speaker device having a speaker unit and a structural body arranged behind and adjacent to the speaker unit, in which the structural body includes a plurality of structural members and the plurality of structural members is bonded to each other.

In a second aspect of the present invention, it is preferable that the plurality of structural members is at least any one of a rod-shaped body, a plate-shaped body, a spherical body, a polyhedral body, an oval body, a conical body, and a composite body of these shapes.

In a third aspect of the present invention, it is preferable that, in the plurality of structural members, the length of the maximum portion in each of the structural members has any one of a plurality of kinds of lengths.

In a fourth aspect of the present invention, it is preferable that the length of the maximum portion in each of the structural members is equal to or less than the diameter of cone paper of the speaker unit.

In a fifth aspect of the present invention, it is preferable that a plurality of spaces connected to a space inside the structural body is formed in an outer peripheral portion of the structural body and some or all of the plurality of spaces are opened to the outside except a portion to which the speaker unit is attached.

In a sixth aspect of the present invention, it is preferable that the structural body forms a spherical shape as a whole and the speaker unit and the structural body are arranged in such a manner that the center line passing through the center of the cone of the speaker unit and the straight line passing through the center of the structural body are in agreement with each other.

In a seventh aspect of the present invention, it is preferable that the structural body is integrally formed with a frame of the speaker unit.

In an eighth aspect of the present invention, it is preferable that the plurality of structural members is irregularly arranged.

In order to achieve the above-described object, a ninth aspect of the present invention is a speaker device having a speaker unit and an enclosure having a housing to a peripheral wall of which the speaker unit is attached and a structural body arranged behind the speaker unit in the housing and integrally formed in the housing while a plurality of structural members being bonded to each other.

In order to achieve the above-described object, a tenth aspect of the present invention is a speaker device having a speaker unit and a structural body of a shape imitating the shape of an amorphous body structure, in which the structural body is arranged behind the speaker unit to be adjacent to the speaker unit.

In order to achieve the above-described object, an eleventh aspect of the present invention is a speaker device having a speaker unit and a structural body arranged behind the speaker unit to be adjacent to the speaker unit, in which the structural body partitions the space by a partition member to form a plurality of spaces.

In order to achieve the above-described object, a twelfth aspect of the present invention is a speaker device having a speaker unit and a structural body arranged behind the speaker unit to be adjacent to the speaker unit, in which the structural body has a shape such that reverse-phase sound waves in all the directions output from the speaker unit are input and the reverse-phase sound waves are advanced while being caused to detour the structural body without being allowed to advance straight.

In order to achieve the above-described object, a thirteenth aspect of the present invention is an enclosure having a structural body arranged behind a speaker unit to be adjacent to the speaker unit, in which the structural body includes a plurality of structural members and the plurality of structural members is bonded to each other.

In order to achieve the above-described object, a fourteenth aspect of the present invention is a speaker device having a speaker unit and a structural body arranged in a space behind the speaker unit, in which the structural body has a plurality of structural members, the plurality of structural members is irregularly arranged and bonded to each other, and the irregular arrangement is defined to be reproducible.

Advantageous Effects of Invention

According to the first aspect of the present invention, the speaker device can damp the sound wave output from the speaker unit to the rear side thereof by causing the sound wave to hit on the plurality of structural members or to pass through spaces formed by the plurality of structural members.

Moreover, due to the fact that the structural body is arranged behind the speaker unit to be adjacent to the speaker unit, the speaker device can effectively damp the sound wave output from the speaker unit to the rear side thereof.

According to the second aspect of the present invention, the plurality of structural members is at least any one of a rod-shaped body, a plate-shaped body, a spherical body, a polyhedral body, an oval body, a conical body, and a composite body of these shapes and is formed by a member of a simple shape.

According to the third aspect of the present invention, due to that fact that, in the plurality of structural members, the length of the maximum portion in each of the structural members has any one of a plurality of kinds of lengths, the speaker device can disperse the natural frequencies of the structural members.

According to the fourth aspect of the present invention, due to the fact that the length of the maximum portion in each of the structural members is equal to or less than the diameter of the cone paper of the speaker unit, the structural body is more compactly configured.

According to the fifth aspect of the present invention, due to the fact that the plurality of spaces connected to the space inside the structural body is formed in the outer peripheral portion of the structural body and some or all of the plurality of spaces are opened to the outside except a portion to which the speaker unit is attached, the speaker device can make it easy for the sound wave output from the speaker unit to the rear side thereof to pass through the inside of the structural body.

According to the sixth aspect of the present invention, the structural body has a symmetrical shape with respect to the center line passing through the center of the cone of the speaker unit, and therefore the speaker device can effectively damp the sound wave output from the speaker unit to the rear side thereof.

According to the seventh aspect of the present invention, due to the fact that the structural body is integrally formed in the frame of the speaker unit, the speaker device can more effectively damp the sound wave output from the speaker unit to the rear side thereof.

According to the eighth aspect of the present invention, due to the fact that the plurality of structural members is irregularly arranged, the speaker device can effectively damp the sound wave output from the speaker unit to the rear side thereof.

According to the ninth aspect of the present invention, the housing is integrally formed in the structural body even when the enclosure has the housing, and therefore the speaker device can more effectively suppress the generation of a standing wave resulting from the vibration of the housing.

According to the tenth aspect of the present invention, the structural body can be more simply configured by being formed into the shape imitating the amorphous body structure. For example, the structure of the structural body can be expressed by an expression, and therefore the structural body can be more simply manufactured.

Moreover, due to the fact that the structural body is arranged behind the speaker unit to be adjacent to the speaker unit, the speaker device can effectively damp the sound wave output from the speaker unit to the rear side thereof.

According to the eleventh aspect of the present invention, the speaker device can damp the sound wave output from the speaker unit to the rear side thereof by causing the sound wave to hit on the partition member or to pass through the spaces partitioned by the partition member.

Moreover, due to the fact that the structural body is arranged behind the speaker unit to be adjacent to the speaker unit, the speaker device can effectively damp the sound wave output from the speaker unit to the rear side thereof.

According to the twelfth aspect of the present invention, the speaker device can damp the reverse-phase sound waves in all the directions output from the speaker unit by advancing the reverse-phase sound waves while causing the reverse-phase sound waves to detour the structural body arranged to be adjacent to the speaker unit without allowing the reverse-phase sound waves to advance straight with the structural body.

Moreover, due to the fact that the structural body is arranged behind the speaker unit to be adjacent to the speaker unit, the speaker device can effectively damp the sound wave output from the speaker unit to the rear side thereof.

According to the thirteenth aspect of the present invention, the enclosure can damp the sound wave output from the speaker unit to the rear side thereof by causing the sound wave to hit on the plurality of rod-shaped bodies or plate-shaped bodies or to pass through the spaces formed by the plurality of rod-shaped bodies or plate-shaped bodies.

Moreover, due to the fact that the structural body is arranged behind the speaker unit to be adjacent to the speaker unit, the enclosure can effectively damp the sound wave output from the speaker unit to the rear side thereof.

According to the fourteenth aspect of the present invention, the speaker unit can damp the sound wave output from the speaker unit to the rear side thereof by causing the sound wave to hit on the plurality of structural members or to pass through the spaces formed by the plurality of structural members.

DESCRIPTION OF EMBODIMENTS

Embodiments of the present invention will now be described with reference to the drawings.

First Embodiment

In a first embodiment, a speaker device will be described.

Configuration

Figure 1:
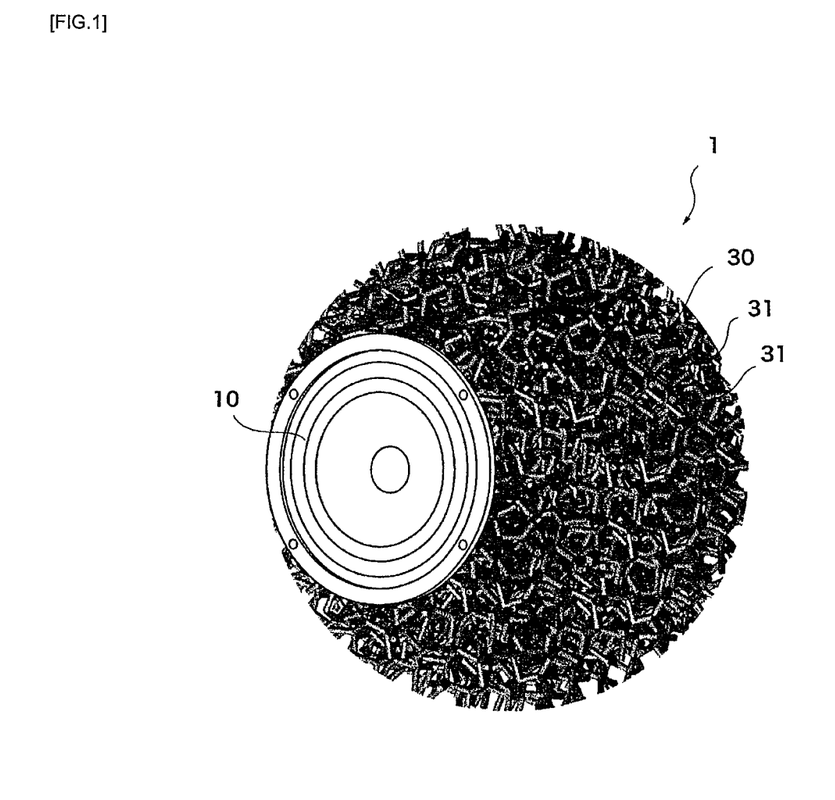
FIG. 1 is a figure illustrating a configuration example of a speaker device in a first embodiment.

FIG. 1 is a figure illustrating a configuration example of a speaker device 1 in the first embodiment. As illustrated in FIG. 1, the speaker device 1 has a speaker unit 10 and an enclosure 30.

Figure 2:
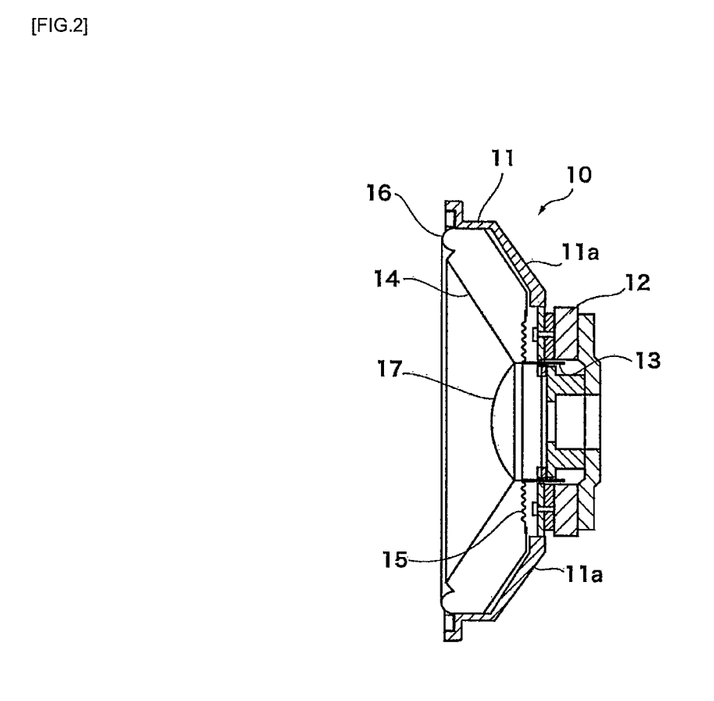
FIG. 2 is a figure illustrating a configuration example of a speaker unit.

FIG. 2 is a figure illustrating a configuration example of the speaker unit 10. As illustrated in FIG. 2, the speaker unit 10 is a common speaker unit. More specifically, the speaker unit 10 has a frame 11, a magnet 12, a voice coil 13, a cone paper (diaphragm or vibrator) 14, a damper 15, an edge 16, a center cap 17, and the like.

The frame 11 serves as a framework of the speaker unit 10 and each component of the speaker unit 10 is attached thereto. More specifically, the magnet 12, the voice coil 13, and the cone paper 14 are attached to the frame 11. The magnet 12 is firmly fixed to the frame 11. The voice coil 13 and the cone paper 14 serve as vibrating portions of the speaker unit 10. Therefore, the voice coil 13 is attached to the frame 11 through the damper 15. The cone paper 14 is attached to the frame 11 through the edge 16 which is a flexible film stretched to surround the outer, periphery of the cone paper 14.

In the frame 11, the portion behind the cone paper 14 is configured by a plurality of narrow arms 11a. A screw hole, which is not illustrated, for screwing the frame 11 to the enclosure 30 is formed in an outer peripheral portion of the frame 11.

The magnet 12 is a doughnut-shaped permanent magnet. Into a space of a cylindrical shape on the inner peripheral side of the magnet 12, the voice coil 13 of a cylindrical shape having a diameter somewhat smaller than the inner peripheral surface of the space is inserted. The voice coil 13 is a kind of a coil and is one obtained by winding a lead around a paper or plastic tube.

The speaker unit 10 is driven as follows. In the speaker unit 10, when electricity (amplifier output) is applied to the voice coil 13, power is generated in the voice coil 13 in response to the magnet 12 arranged in the outer periphery thereof, so that the cone paper 14 is vibrated. The vibration of the cone paper 14 vibrates air. The air vibration causes change in the air pressure, thereby allowing a user to hear as sound.

It is noted that the speaker unit 10 is not limited to the configuration in this embodiment.

The speaker unit 10 is attached to be fitted into the enclosure 30. More specifically, the enclosure 30 is arranged behind (or on the rear surface of) the speaker unit 10 to be adjacent to the speaker unit 10.

The enclosure 30 has an outer shape forming a spherical shape as a whole. The internal structure of the enclosure 30 has a complicated, disordered, or random shape and forms a structure imitating an amorphous structure or an amorphous model structure.

Figure 3:
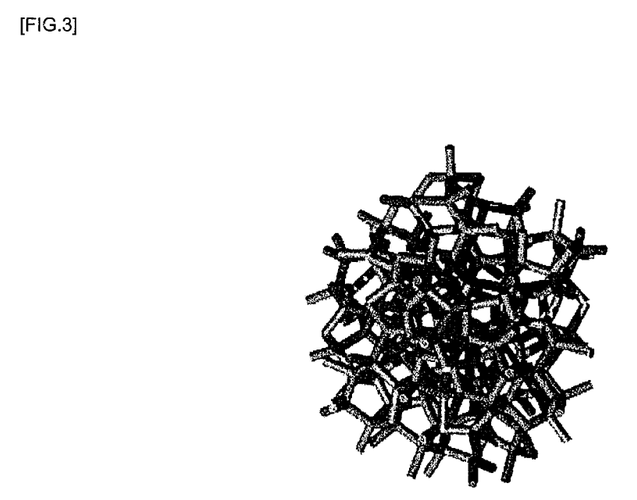
FIG. 3 is a figure illustrating an example of an amorphous structure.

FIG. 3 is a figure illustrating an example of the amorphous structure. The internal structure is configured by a structure imitating the amorphous structure as illustrated in FIG. 3.

Specifically, the internal structure forms a structure in which a plurality of rod-shaped bodies 31 is irregularly arranged and bonded to each other or integrally connected in a space. More specifically, the internal structure forms a structure in which the plurality of rod-shaped bodies 31 having various lengths is integrally combined and in which an end portion of each rod-shaped body 31 is integrally connected to an end portion of one rod-shaped body 31 or end portions of the plurality of rod-shaped bodies 31 arranged in a two-dimensional plane or a three-dimensional space including the rod-shaped body 31 with respect to the rod-shaped body 31. In other words, in the internal structure, the rod-shaped bodies 31 having various lengths, the rod-shaped bodies 31 having random lengths, or the rod-shaped bodies 31 having irregular lengths are bonded or connected to an end portion of the other one or end portions of the plurality of rod-shaped bodies 31 at end portions thereof to form a three-dimensional structure.

The irregular arrangement is defined to be reproducible. Alternatively, the irregular arrangement is artificial. The irregular length is defined to be reproducible. Alternatively, the irregular length is an artificial length. The irregular arrangement is determined beforehand, set beforehand, or designed beforehand. Alternatively, the irregularity is determined beforehand, set beforehand, or designed beforehand. Thus, the enclosure 30 is manufactured, for example, to be reproducible as one having the same shape although the shape of the internal structure is irregular. The plurality of rod-shaped bodies 31 are formed respectively in various lengths, random lengths, or irregular lengths, and thus there exist various lengths in the maximum portions of the plurality of rod-shaped bodies 31.

In the industry of audio equipment, a common enclosure forms a closed space behind a speaker unit and a sound output from the rear surface of the speaker unit is input into the enclosure. In this application, although the enclosure 30 does not form the closed space behind the speaker unit, the enclosure 30 is located behind the speaker unit 10 and has a function that a sound output from the rear surface of the speaker unit 10 is input into the enclosure 30 as with the common enclosure, and therefore the enclosure 30 is referred to as "enclosure". The enclosure 30 may be referred to as a housing body or a support body of the speaker unit 10.

In a part of the outer peripheral surface of the enclosure 30, a storing and attaching portion, which is not illustrated, of the speaker unit 10 is formed. The storing and attaching portion forms a concave portion shape matched with the shape of the rear side of the speaker unit 10. In the outer periphery of the storing and attaching portion which is the outer peripheral surface of the enclosure 30, a fixing and attaching portion, which is not illustrated, of the speaker unit 10 is formed. The outer periphery of the speaker unit 10 (specifically, frame 11) is fixed to the fixing and attaching portion with a screw or the like.

Herein, the rod-shaped body 31 is a round bar having a cross-sectional shape of a circular shape. The length of the rod-shaped body 31 is equal to or less than the diameter of the cone paper 14 of the speaker unit 10, for example. In the enclosure 30, the rod-shaped bodies 31 are integrally formed by a 3D printer, for example, without being pasted and joined. In this case, the irregular arrangement is defined to be reproducible so that the rod-shaped bodies 31 can be manufactured by a 3D printer or the like. Alternatively, the irregularity is determined beforehand so that the rod-shaped bodies 31 can be manufactured by a 3D printer or the like. The enclosure 30 is formed of various materials, such as plastic resin, metal, and glass, for example.

In the enclosure 30, spaces of various shapes are formed by the enclosure by the connected plurality of rad-shaped bodies 31 due to the above-described internal structure.

In the first embodiment, the rod-shaped bodies 31 can also be referred to as partition members partitioning the space behind the speaker unit 10 to form a plurality of spaces.

Figure 4:
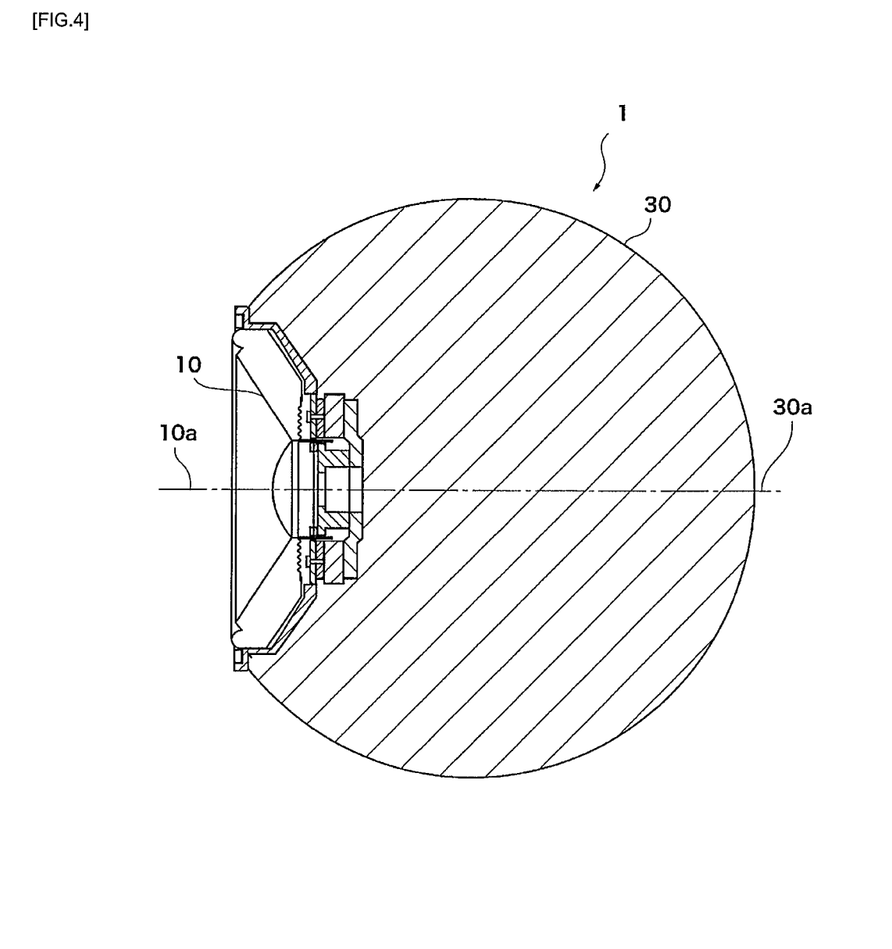
FIG. 4 is a schematic view illustrating the positional relationship between the speaker unit and the enclosure.

FIG. 4 is a schematic view illustrating the positional relationship between the speaker unit 10 and the enclosure 30. As illustrated in FIG. 4, the speaker unit 10 is attached to the enclosure 30 so that a center line 10a passing through the center of the cone paper 14 of the speaker unit 10 and a straight line 30a passing through the center of the enclosure 30 are in agreement with each other with respect to such an enclosure 30.

Action, Operation, and the Like

Next, the action, the operation, and the like of the speaker device 1 in the first embodiment will be described.

In the speaker device 1, when the speaker unit 10 is driven, the cone paper 14 is driven, so that a sound wave is output from the front surface side (or a front portion side) of the speaker unit 10. Meanwhile, a reverse-phase sound wave is output from the rear side of the speaker unit 10, and the reverse-phase sound wave is absorbed in the enclosure 30. More specifically, the sound wave output to the rear side of the speaker unit 10 is damped by passing through the spaces enclosed by the connection of the plurality of rod-shaped bodies 31 one after another. More specifically, the sound waves in all the directions output to the rear side of the speaker unit 10 are damped by being blocked by the plurality of rod-shaped bodies 31 to advance while detouring the plurality of rod-shaped bodies 31 without advancing straight in the enclosure 30.

Moreover, at this time, the plurality of rod-shaped bodies 31 has lengths different from each other, and therefore the natural frequencies or the resonance frequencies of the rod-shaped bodies 31 vary. Therefore, the resonance can be suppressed as compared with a case in which all the rod-shaped bodies 31 configuring the enclosure 30 have the same length, for example.

As described above, in the speaker device 1, due to the fact that the sound wave output to the rear side of the speaker unit 10 passes through the spaces enclosed by the connection of the plurality of rod-shaped bodies 31 one after another, the generation of a standing wave can be suppressed.

Effects in First Embodiment (1) The speaker device 1 can damp the sound wave output from the speaker unit 10 to the rear side thereof by causing the sound wave to hit on the plurality of rod-shaped bodies 31 or to pass through the spaces formed by the plurality of rod-shaped bodies 31. Thus, the speaker device 1 can suppress the generation of the standing wave resulting from the sound wave output from the speaker unit 10 to the rear side thereof.

(2) Each of the plurality of rod-shaped bodies 31 is formed of a member of a simple shape, such as a round bar.

(3) Due to the fact that the enclosure 30 is arranged behind and adjacent to the speaker unit 10, the speaker device 1 can effectively damp the sound wave output from the speaker unit 10 to the rear side thereof.

(4) Due to the fact that the lengths of the rod-shaped bodies 31, i.e., the lengths of the maximum portions in the rod-shaped bodies 31, are formed respectively in various lengths, the speaker device 1 can disperse the natural frequencies of the rod-shaped bodies 31. Thus, the speaker device 1 can disperse the resonance frequencies of the enclosure 30 and more effectively suppress the generation of a standing wave.

(5) Due to the fact that the lengths of the rod-shaped bodies 31 are equal to or less than the diameter of the cone paper 14 of the speaker unit 10, the enclosure 30 is more compactly configured.

(6) Due to the fact that the plurality of spaces connected to the space inside the enclosure 30 formed in the outer periphery of the enclosure 30 is exposed to the outside or opened to the outside without being closed as viewed from the outside, the speaker device 1 can make it easy for the sound wave output from the speaker unit 10 to the rear side thereof to pass through the inside of the enclosure 30. Thus, the speaker device 1 can efficiently cause the sound wave output from the speaker unit 10 to the rear side thereof to hit on the plurality of rod-shaped bodies 31 or to pass through the spaces formed by the plurality of rod-shaped bodies 31, and therefore the speaker device 1 can more effectively damp the sound wave output from the speaker unit 10 to the rear side thereof.

(7) Since the enclosure 30 has a symmetrical shape with respect to the center line passing through the center of the cone paper 14 of the speaker unit 10, the speaker device 1 can effectively damp the sound wave output from the speaker unit 10 to the rear side thereof.

(8) The enclosure 30 can be more simply configured by being formed into the structure imitating an amorphous body structure. For example, the structure of the enclosure 30 can be expressed by an expression, and therefore the enclosure 30 can be more simply manufactured by a 3D printer or the like.

(9) The speaker device 1 can damp the reverse-phase sound waves in all the directions output from the speaker unit 10 by advancing the reverse-phase sound waves while causing the reverse-phase sound waves to detour the structural body arranged to be adjacent to the speaker unit 10 without allowing the reverse-phase sound waves to advance straight with the structural body.

Second Embodiment

Figure 5:
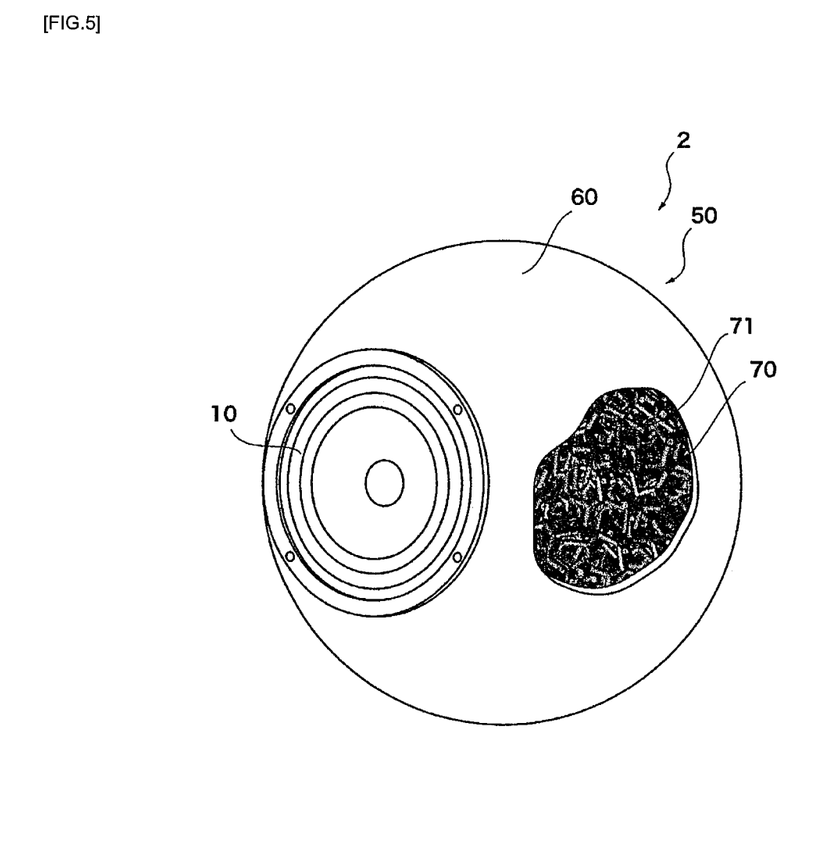
FIG. 5 is a figure illustrating a configuration example of a speaker device in a second embodiment.

Next, a second embodiment will be described with reference to the drawings. The description is given while attaching the same reference numerals to the same configurations as those of the first embodiment. The second embodiment also discloses a speaker device 2. In the second embodiment, the speaker device 2 has a housing and a speaker unit 10 is attached to the wall surface of the housing.

FIG. 5 is a figure illustrating a configuration example of the speaker device 2 in the second embodiment. As illustrated in FIG. 5, the speaker device 2 has the speaker unit 10 and an enclosure 50 containing a housing 60.

The speaker unit 10 has the same configuration as that of the first embodiment. The speaker unit 10 is attached to the peripheral wall configuring the housing 60.

The enclosure 50 has the housing 60 and a structural body 70. The housing 60 forms a substantially spherical shape as a whole. The speaker unit 10 is attached to a part of the peripheral wall of the housing 60. Therefore, a fixing and attaching portion (not illustrated) capable of accommodating a structure portion behind the speaker unit 10 is formed in the peripheral wall of the housing 60 and the outer periphery of the speaker unit 10 is fixed to the fixing and attaching portion with a screw or the like.

The enclosure 50 has a structural body 70 having the same structure as that of the enclosure 30 in the first embodiment thereinside. More specifically, the structural body 70 is arranged behind the speaker unit 10 to be adjacent to the speaker unit 10, for example. The structural body 70 forms a structure in which a plurality of rod-shaped bodies 71 having various lengths is integrally combined and forms a structure in which an end portion of each rod-shaped body 71 is integrally connected to an end portion of one rod-shaped body 71 or a plurality of end portions of the plurality of rod-shaped bodies 71 arranged in a two-dimensional plane or a three-dimensional space including the rod-shaped body 71 with respect to the rod-shaped body 71.

A storing and attaching portion, which is not illustrated, of the speaker unit 10 is formed in a portion which is the outer peripheral surface of the structural body 70 and which corresponds to the position where the fixing and attaching portion of the housing 60 is formed. The storing and attaching portion forms a concave portion shape matched with the shape of the rear side of the speaker unit 10.

In the enclosure 50, the structural body 70 and the housing 60 are integrally formed. For example, the structural body 70 and the housing 60 are integrally formed by a 3D printer. In the enclosure 50, the structural body 70 and the housing 60 are integrally formed using resin, such as plastic, metal, or glass, for example.

In FIG. 5, the peripheral wall of the housing 60 is partially cut off, so that the structural body 70 is exposed to the outside. This is because, in order to describe that the structural body 70 is present in the housing 60, the peripheral wall of the housing 60 is partially cut off. In fact, the peripheral wall of the housing 60 is not cut off.

Action, Operation, and the Like

Next, the operation, the action, and the like of the speaker device 2 in the second embodiment are described.

Similarly in the second embodiment, when the speaker unit 10 is driven, a sound wave is output also from the rear side of the speaker unit 10. However, the sound wave is absorbed in the enclosure 50. More specifically, the sound wave output to the rear side of the speaker unit 10 is damped by passing through spaces enclosed by the connection of the plurality of rod-shaped bodies 71 in the structural body 70 one after another in the enclosure 50.

At this time, the plurality of rod-shaped bodies 71 has lengths different from each other, and therefore the natural frequencies or the resonance frequencies of the rod-shaped bodies 71 vary. Therefore, the resonance can be suppressed as compared with a case in which all the rod-shaped bodies 71 configuring the enclosure 50 have the same length, for example.

Moreover, the housing 60 and the structural body 70 are integrally formed, and therefore the housing 60 is suppressed from vibrating by being bonded to the structural body 70. Accordingly, vibration resulting from the sound wave output from the rear side of the speaker unit 10 is suppressed.

As described above, in the speaker device 2, due to the fact that the sound wave output to the rear side of the speaker unit 10 passes through the spaces enclosed by the connection of the plurality of rod-shaped bodies 71 one after another, the generation of a standing wave can be suppressed.

Effects in Second Embodiment

In the second embodiment, the following effects can be obtained besides the same effects as those in the first embodiment.

(1) Even when the enclosure 50 has the housing 60, the housing 60 is integrally formed in the structural body 70. Therefore, the speaker device 2 can more effectively suppress the generation of a standing wave resulting from the vibration of the housing 60.

In the description of the embodiments above, the rod-shaped bodies 31 and 71 configure a structural member, for example.

Modification of this Embodiment and the Like

As another example of the embodiments above, all of the lengths of the rod-shaped bodies 31 and 71 can also be made the same.

As another example of the embodiments above, the cross-sectional shapes of the rod-shaped bodies 31 and 71 are not limited to being formed into the circular shape and the cross-sectional shapes of the rod-shaped bodies 31 and 71 can also be formed into the other shapes. For example, the cross-sectional shape of the rod-shaped bodies 31 and 71 can also be formed into a polygonal-shaped cross section. Moreover, the rod-shaped bodies 31 and 71 can also be formed into a plate-shaped body having a rectangular-shaped cross section. Moreover, the rod-shaped bodies 31 and 71 can also be formed into at least any one of a spherical body, a polyhedral body, an oval body, a conical body, and a composite body of these shapes in addition to the rod-shaped body and the plate-shaped body. In this case, in the enclosure 50 or the structural body 70, the lengths (lengths, widths, heights, and the like) of the maximum portions of the rod-shaped body, the plate-shaped body, the spherical body, the polyhedral body, the oval body, the conical body, or the composite body of these shapes can also be set to lengths different from the lengths of the other bodies. Moreover, the lengths (lengths, widths, heights, and the like) of the maximum portions of the rod-shaped body, the plate-shaped body, the spherical body, the polyhedral body, the oval body, the conical body, or the composite body of these shapes can also be set to a length equal to or less than the diameter of the cone paper of the speaker unit 10. Moreover, in the case of the conical body, a cone and a pyramid (a triangular pyramid, a quadrangular pyramid, and the like) are mentioned. The conical body can also be arranged in the enclosure 50 or the structural body 70 so that the apex is directed to the speaker unit 10 side.

As another example of the embodiments above, the enclosure 50 and the structural body 70 can also be configured by mixing the rod-shaped body, the plate-shaped body, the spherical body, the polyhedral body, the oval body, the conical body, and the composite body of these shapes. More specifically, the enclosure 50 and the structural body 70 can also be configured by mixing members of various cross-sectional shapes.

Moreover, as another example of the embodiments above, a joining portion of the rod-shaped bodies 31, 71 which are integrated can also be made thick (for example, a spherical-shaped thick portion).

Moreover, as another example of the embodiments above, the rod-shaped bodies 31, 71 are not limited to being connected at the end portions. For example, to intermediate portions or the like which are not the end portions of the rod-shaped bodies 31, 71 of a linear shape, end portions of the other rod-shaped bodies 31, 71 can also be connected.

Moreover, as another example of the embodiments above, the enclosure 50 and the structural body 70 can also be integrally formed with the frame 11 of the speaker unit 10 without forming a joining portion. More specifically, the enclosure 50 and the structural body 70 form an integral structure with the frame 11 of the speaker unit 10. Moreover, in the case of the second embodiment, the housing 60 can also be integrally formed with the frame 11 without forming a joining portion.

Thus, the speaker devices 1, 2 can more effectively damp the sound wave output from the speaker unit 10 to the rear side thereof by integrally forming the enclosure 50, the structural body 70, and the housing 60 with the frame 11 of the speaker unit 10 without forming a joining portion.

Moreover, as another example of the embodiments above, a distribution can also be given to the density in the enclosure 30 and the structural body 70, i.e., the density of the number of the structural members. For example, by increasing the number of the structural members in the periphery or on the rear side of the speaker unit 10 in the outer peripheral portion of the enclosure 30 and the structural body 70, the density can also be made higher than that in the other portions.

Moreover, as another example of the first embodiment, the outer shape of the enclosure 30 is not limited to being formed into the spherical shape and the outer shape of the enclosure 30 can also be formed into the other shapes. For example, the outer shape of the enclosure 30 can also be formed into a square prism shape or an oval shape.

As another example of the second embodiment, the housing 60 is not limited to the spherical shape and the shape of the housing 60 can also be formed into the other shapes. For example, the housing 60 can also be formed into a square prism shape or an oval shape. Moreover, the outer shape of the structural body 70 also becomes the shape matched with such a shape of the housing 60. For example, the outer shape of the structural body 70 can also be formed into a square prism shape or an oval shape.

Figure 6:
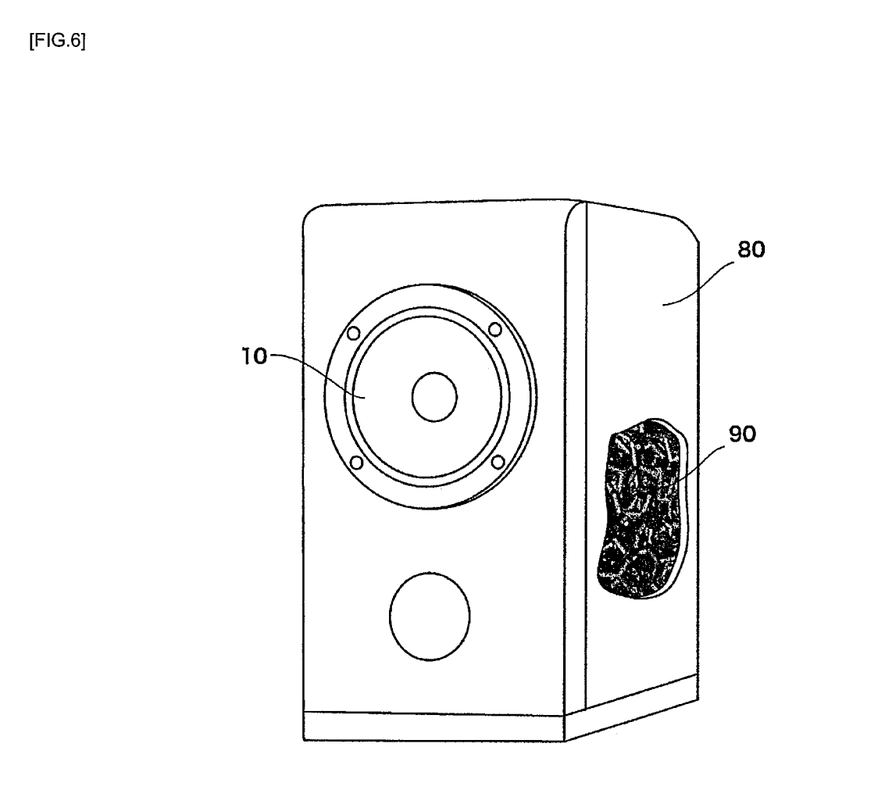
FIG. 6 is a figure illustrating another configuration example of the speaker device.

FIG. 6 is a figure illustrating another configuration example of a speaker device. As illustrated in FIG. 6, a housing 80 has a square prism shape and a structural body 90 becomes a square prism shape matched with the shape of the housing 80.

Moreover, as another example of the second embodiment, the housing 60 is not limited to the shape of covering the entire outer periphery of the structural body 70 and the housing 60 can also be formed into a shape of covering a part of the outer periphery of the structural body 70.

Figure 7:
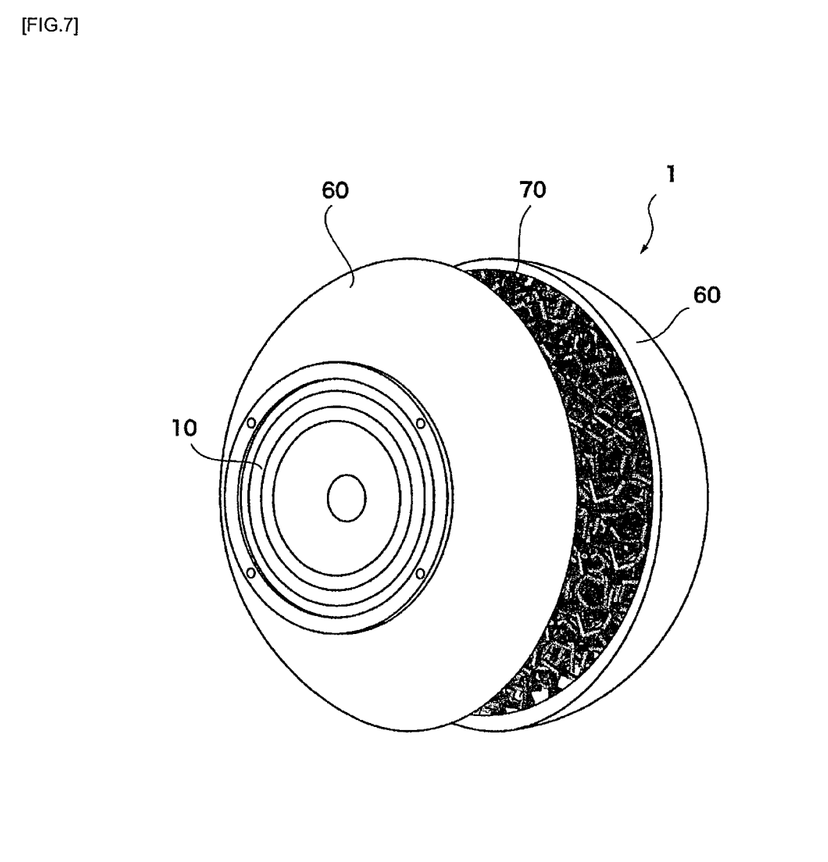
FIG. 7 is a figure illustrating an example in which a housing is formed into a shape of covering a part of the outer periphery of a structural body.

FIG. 7 is a figure illustrating an example in which the housing 60 is formed into a shape of covering a part of the outer periphery of the structural body 70. As illustrated in FIG. 7, the peripheral wall of the housing 60 is provided in the periphery of the speaker unit 10 and a portion on the side opposite to the mounting position of the speaker unit 10, i.e., on the rear side of the speaker unit 10. Alternatively, the peripheral wall of the housing 60 can also be provided in at least one of the periphery and the rear side of the speaker unit 10.

Moreover, for example, an opening is formed in a portion on the side opposite to the mounting position of the speaker unit 10, i.e., the rear side of the structural body 70, without providing the peripheral wall and the peripheral wall can also be formed in the other portions in the housing 60. More specifically, the housing 60 has the peripheral wall formed in the circumferential direction with respect to the straight line passing through the center of the structural body 70 in agreement with the center line passing through the center of the cone paper 14 of the speaker unit 10, i.e., a substantially annular-shaped peripheral wall.

Moreover, the embodiments above realize the speaker device having the speaker unit and the structural body of the shape imitating the shape of an amorphous body structure, in which the structural body is arranged behind the speaker unit to be adjacent to the speaker unit.

Moreover, the embodiments above realize the speaker device having the speaker unit and the structural body arranged behind the speaker unit to be adjacent to the speaker unit, in which the structural body partitions the space by the partition members to form a plurality of spaces.

Moreover, the embodiments above realize the speaker device having the speaker unit and the structural body arranged behind the speaker unit to be adjacent to the speaker unit, in which the structural body has the shape such that reverse-phase sound waves in all the directions output from the speaker unit are input and the sound waves are advanced while being caused to detour the structural body without being allowed to advance straight.

Moreover, the embodiments above realize the speaker device having the speaker unit and the enclosure having the housing to the peripheral wall of which the speaker unit is attached and the structural body arranged in the space behind the speaker unit in the housing and integrally formed in the housing without forming a joining portion while the plurality of structural members being irregularly arranged and bonded to each other, in which the irregular arrangement is defined to be reproducible.

Moreover, the embodiments above realize the speaker device having the speaker unit and the structural body arranged in the space behind the speaker unit, in which the structural body has the shape imitating the shape of an amorphous body structure, the shape of the amorphous body structure is a shape having irregularity, and the shape having irregularity is defined to be reproducible.

Moreover, the embodiments above realize the speaker device having the speaker unit and the structural body arranged in the space behind the speaker unit, in which the structural body forms the plurality of spaces by partitioning the space by the partition members, the partition members are irregularly arranged, and the irregular arrangement is defined to be reproducible.

Moreover, the embodiments above realize the speaker device having the speaker unit and the structural body arranged in the space behind the speaker unit, in which the structural body has the shape such that reverse-phase sound waves in all the directions output from the speaker unit are input and the sound waves are advanced while being caused to detour the structural body without being allowed to advance straight and the shape is a shape having irregularly defined to be reproducible.

Moreover, the embodiments above realize the enclosure having the structural body arranged in the space behind the speaker unit, in which the structural body includes the plurality of structural members, the plurality of structural members is irregularly arranged and bonded to each other, and the irregular arrangement is defined to be reproducible.

The embodiments of the present invention are disclosed but it is clear that a person skilled in the art can alter the embodiments without deviating from the scope of the present invention. It is intended that the following claims be interpreted to cover such modifications and equivalents.

REFERENCE SIGNS LIST 1, 2 speaker device
10 speaker unit
30, 50 enclosure
31, 71 rod-shaped body
60, 80 housing
70, 90 structural body

The invention claimed is:

1. A speaker device comprising:
a speaker unit; and
a structural body arranged behind and adjacent to the speaker unit, wherein
the structural body includes a plurality of structural members, wherein the plurality of structural members are bonded to each other; and
wherein the length of the maximum portion in each of the structural members is equal to or less than a diameter of cone paper of the speaker unit.

2. The speaker device according to claim 1, wherein the plurality of structural members include at least any one of a rod-shaped body, a plate-shaped body, a spherical body, a polyhedral body, an oval body, a conical body, and a complex thereof.

3. The speaker device according to claim 1, wherein the plurality of structural members are formed in various lengths, each of which is a maximum portion of each of the structural members.

4. The speaker device according to claim 1, wherein a plurality of spaces connected to a space inside the structural body are formed in an outer peripheral portion of the structural body, and
some or all of the plurality of spaces are opened to an outside except a portion to which the speaker unit is attached.

5. The speaker device according to claim 1, wherein
the structural body forms a spherical shape as a whole, and
the speaker unit and the structural body are arranged in such a manner that a center line passing through a center of a cone of the speaker unit and a straight line passing through a center of the structural body are in agreement with each other.

6. The speaker device according to claim 1, wherein
the structural body is integrally formed with a frame of the speaker unit.

7. The speaker device according to claim 1, wherein
the plurality of structural members is irregularly arranged.

8. The speaker device of claim 1, further comprising:
a housing in which the speaker unit and the structural body are enclosed.

9. The speaker device of claim 1 wherein:
the structural body having an amorphous shape.

10. The speaker device of claim 1 wherein
the structural body has a shape such that reverse-phase sound waves in all the directions output from the speaker unit are input and the reverse-phase sound waves are advanced while being caused to detour the structural body without being allowed to advance straight.

11. The speaker device of claim 10 further comprising:
a housing in which the speaker unit and structural body are enclosed.

\* \* \* \* \*